(12) United States Patent
Shima

(10) Patent No.: US 8,571,074 B2
(45) Date of Patent: Oct. 29, 2013

(54) FIBER LASER DEVICE

(75) Inventor: Kensuke Shima, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/787,850

(22) Filed: May 26, 2010

(65) Prior Publication Data

US 2010/0303103 A1    Dec. 2, 2010

(30) Foreign Application Priority Data

May 28, 2009   (JP) ................................ 2009-129704

(51) Int. Cl.
*H01S 3/30* (2006.01)

(52) U.S. Cl.
USPC ............................................. 372/6; 372/70

(58) Field of Classification Search
USPC ............................................................ 372/6
See application file for complete search history.

(56) References Cited

U.S. PATENT DOCUMENTS

| | | | |
|---|---|---|---|
| 2003/0138000 A1* | 7/2003 | Bayart et al. ...................... 372/6 |
| 2004/0170209 A1* | 9/2004 | Matuschek et al. ............. 372/97 |
| 2008/0013574 A1 | 1/2008 | Furuya et al. | |
| 2008/0219298 A1* | 9/2008 | Ahn et al. ......................... 372/6 |
| 2009/0161700 A1* | 6/2009 | Mizuuchi et al. ................ 372/6 |
| 2010/0079853 A1* | 4/2010 | Rakich et al. ................ 359/334 |

FOREIGN PATENT DOCUMENTS

| | | |
|---|---|---|
| EP | 0435217 A3 | 7/1991 |
| EP | 1 777 787 A2 | 4/2007 |
| JP | 3219415 B2 | 10/2001 |
| JP | 2009-59953 A | 3/2009 |
| WO | 2009/057308 A1 | 5/2009 |
| WO | 2009/057309 A1 | 5/2009 |

* cited by examiner

*Primary Examiner* — Xinning Niu
(74) *Attorney, Agent, or Firm* — Westerman, Hattori, Daniels & Adrian, LLP

(57) ABSTRACT

[Object] An object of the invention is to provide a fiber laser device capable of stabilizing intensity of laser light output therefrom.
[Means to attain the object] A fiber laser device 100 includes: an pumping light source 11 configured to output pumping light; a rare earth-doped fiber 20 to which the pumping light is input; and a first FBG 30 formed on one side of the rare earth-doped fiber 20 and a second FBG 40 formed on the other side of the rare earth-doped fiber 20 that are configured to reflect light amplified in the rare earth-doped fiber 20, wherein the second FBG 40 has a reflectance lower than that of the first FBG 30, a reflection wavelength band in that of the first FBG 30, and Bragg wavelength on short wavelength side of Bragg wavelength of the first FBG 30.

4 Claims, 4 Drawing Sheets

US 8,571,074 B2

FIBER LASER DEVICE

TECHNICAL FIELD

The invention relates to a fiber laser device.

BACKGROUND ART

A fiber laser device of fabry-perot type is now in practical use as a type of fiber laser device. In this fiber laser device of fabry-perot type, pumping light of a predetermined wavelength is input to a rare earth-doped fiber from an pumping light source and light of longer wavelength than the input pumping light is emitted from the rare earth-doped fiber. Then, the light emitted from the rare earth-doped fiber is reflected by one of FBGs (Fiber Bragg Grating) formed on both sides of the rare earth-doped fiber. The light that is reflected is again input to the rare earth-doped fiber and amplified. The amplified light is then reflected by the FBG on a side of the rare earth-doped fiber, which is opposite to the FBG that has reflected the light. In this manner, light is amplified each time when the light is reflected by the FBGs formed on both sides of the rare earth-doped fiber and passes through the rare earth-doped fiber and a part of the amplified light is output through one of the FBGs as laser light.

Patent Document 1 listed below discloses an example of a fiber laser device. In the fiber laser device disclosed in Patent Document 1, two FBGs have their center wavelengths of light reflected by the FBGs, which are Bragg wavelengths, same as each other. Accordingly, light of the wavelength same as the Bragg wavelength of each of the FBGs resonates between the two FBGs and is output through one of the FBGs as laser light.

[Patent Document 1] Japanese Patent No. 3219415

SUMMARY OF INVENTION

However, in the fiber laser, device described in Patent Document 1 listed above, there may be a case where the output intensity of output laser light is instable.

Therefore, an object of the invention is to provide a fiber laser device capable of stabilizing intensity of laser light output therefrom.

To attain the object, the inventor have devoted themselves to investigate the cause of instability of laser light output from the fiber laser device disclosed in Patent Document 1. As a result, the inventor have found that the cause of the instability of output intensity of laser light output from the fiber laser device is that dispersion of light reflected by the FBGs is not considered in the fiber laser device disclosed in Patent Document 1.

Specifically, light resonating between two FBGs includes not only light having a wavelength same as Bragg wavelength of the FBGs but also light having a wavelength slightly shifted from the Bragg wavelength of the FBGs in a reflection wavelength band of the FBGs. When light input to the FBGs is reflected by the FBGs, light having the wavelength same as the Bragg wavelength of the FBGs is reflected on the near side of the FBGs as seen from the light input side. On the other hand, light having a wavelength that is shifted away from the Bragg wavelength of the FBGs toward the long wavelength side or the short wavelength side even in the reflection wavelength band is reflected on the far side of the FBGs as seen from the light input side. Accordingly, as to light having the wavelength same as the Bragg wavelength of the FBGs, it takes short time for reflected light to return while as to light having a wavelength shifted farther away from the center wavelength of the FBGs toward the long wavelength side or the short wavelength side, it takes longer time for reflected light to return. Therefore, a time required for reflection is minimum when light has a wavelength same as the Bragg wavelength of the FBGs.

Here, a speed of light is proportional to a refractive index of medium through which the light passes. Assuming that the FBGS are media through which light passes, the fact that a time required for reflection is minimum when light has the wavelength same as the Bragg wavelength of the FBGs means that the refractive index of the FBGs is minimum when light input to the FBGs has the wavelength same as the Bragg wavelength of the FBGs, while the refractive index of the FBGs becomes larger as the wavelength is shifted farther away from Bragg wavelength of the FBGs. Accordingly, the FBGs exerts a larger refractive index to light input to the FBGs as the light has a wavelength shifted farther away from the Bragg wavelength of the FBGs toward the long wavelength side or the short wavelength side. Therefore, the FBGs causes normal dispersion on the short length side from the Bragg wavelength of the FBGs since the refractive index becomes larger on a light having a shorter wavelength, while causing anomalous dispersion on the long length side from the center wavelength of the FBGs since the refractive index becomes larger on a light having a longer wavelength.

It is known that an anomalous dispersion medium has properties to cause light input thereto while changing in time to output with the slight change of intensity of input light emphasized due to a non-linear phenomenon called modulation instability. Therefore, as to the light of a wavelength to which the FBGs exerts the property of anomalous dispersion, the output of the laser light largely changes with a slight change of light input to the FBGs due to modulation instability. The inventors have reached a conclusion that the intensity of output laser may be instable due to the behavior as described above.

Because of this situation, the inventor have further researched a fiber laser device capable of preventing the FBGs from exerting modulation instability to light input thereto so as to make the invention.

Specifically, a fiber laser device according to the invention includes: an pumping light source configured to output pumping light; a rare earth-doped fiber to which the pumping light is input; and a first FBG formed on one side of the rare earth-doped fiber and a second FBG formed on the other side of the rare earth-doped fiber that are configured to reflect light amplified in the rare earth-doped fiber, wherein the second FBG has a reflectance lower than that of the first FBG, a reflection wavelength band in that of the first FBG, and Bragg wavelength on short wavelength side of Bragg wavelength of the first FBG.

With such a fiber laser device, when the pumping light output from the pumping light source is input to the rare earth-doped fiber, the earth elements in the rare earth-doped fiber are excited. The excited earth elements emit light having a longer wavelength than the pumping light. The light is input from the rare earth-doped fiber to the second FBG and reflected by the second FBG. The light that is reflected is again input to the rare earth-doped fiber as the reflected light. Then, in the rare earth-doped fiber, intensity of the reflected light is amplified by the stimulated emission of the earth elements caused by the reflected light. Further, the reflected light is input to the first FBG and then reflected. Then, the reflected light is again input to the rare earth-doped fiber and amplified. By repeating the process, light resonates between the first FBG and the second FBG while being amplified. A part of light resonating while being amplified is output as laser light from the side of the second FBG having the lower reflectance.

At this time, since the reflection wavelength band of the second FBG is in the reflection wavelength band of the first FBG and the reflectance of the second FBG is lower than that of the first FBG, the center wavelength of the light resonating between the first FBG and the second FBG becomes the same as the Bragg wavelength of the second FBG. Also, since the Bragg wavelength of the second FBG is on the short wavelength side of the Bragg wavelength of the first FBG, the center wavelength of the light resonating between the first FBG and the second FBG becomes a wavelength on the short wavelength side of the Bragg wavelength of the first FBG. Accordingly, light reflected by the first FBG is made to have a wavelength on the short wavelength side of Bragg wavelength of the first FBG, so that the first FBG exerts the property of normal dispersion with respect to light input thereto. Therefore, the first FBG is prevented from exerting modulation instability. Accordingly, the intensity of light output as laser light from the second FBG can be stabilized.

It is preferable in the fiber laser device that the first FBG has the reflectance that is substantially constant in a predetermined wavelength region in the reflection wavelength band.

It is preferable in the fiber laser device that Bragg wavelength of the second FBG is an intermediate wavelength between the wavelength which is at the shortest wavelength side of the predetermined wavelength region in which the reflectance of the first FBG is substantially constant, and the Bragg wavelength of the first FBG.

As described above, according to the invention, a fiber laser device capable of stabilizing intensity of laser light output therefrom can be provided.

DETAILED DESCRIPTION OF THE INVENTION

Figure 1:
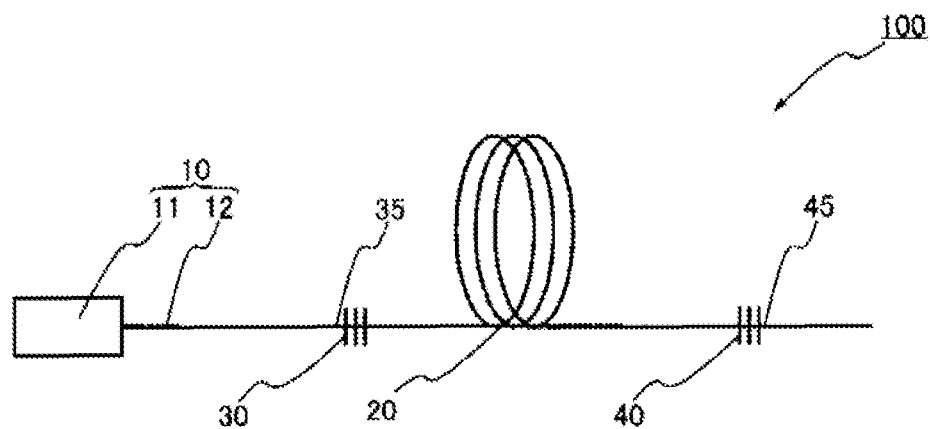
FIG. 1 shows a fiber laser device according to an embodiment of the invention.

Suitable embodiments of a fiber laser device according to the invention will, be explained in detail hereinafter referring to the drawings.

FIG. 1 shows a fiber laser device according to an embodiment of the invention.

As shown in FIG. 1, a fiber laser device 100 includes: an pumping light source portion 10; an optical fiber 35 that is fusion-connected to the pumping light source portion 10 and formed with a first FBG 30; a rare earth-doped fiber 20 that is fusion-connected to the optical fiber 35; and an optical fiber 45 that is fusion-connected to the rare earth-doped fiber 20 and formed with a second FBG 40. In FIG. 1, connecting parts between the optical fibers 35 and 45 and the rare earth-doped fiber 20 are not shown.

The pumping light source portion 10 includes: an pumping light source 11 configured to output pumping light of a wavelength $\lambda_p$; and an optical fiber 12 through which pumping light output from the pumping light source 11 propagates. Through the optical fiber 12, pumping light propagates as multi mode light.

Figure 2:
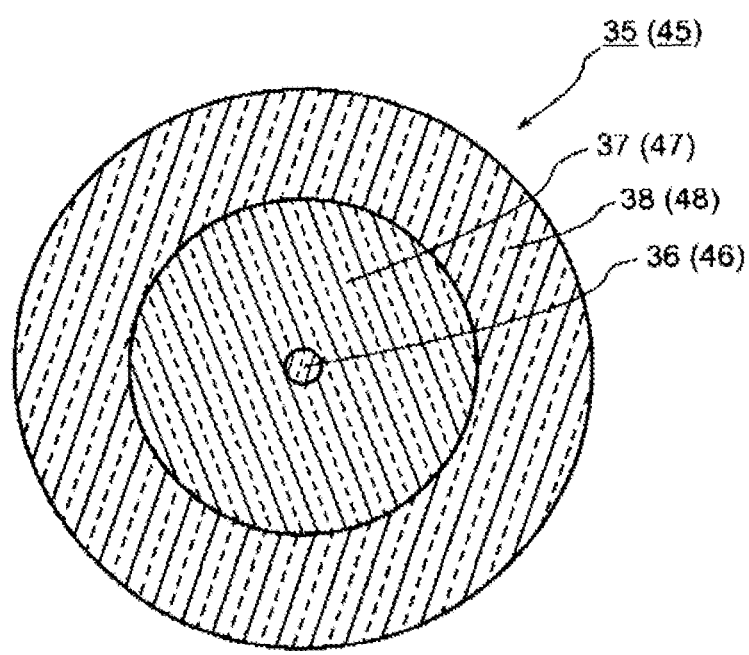
FIG. 2 schematically shows a structure of a cross-section perpendicular to a longitudinal direction of an optical fiber shown in FIG. 1.

FIG. 2 schematically shows a structure of a cross-section perpendicular to a longitudinal direction of the optical fibers 35 and 45. Here, the optical fibers 35 and 45 have the similar structure, and thus only the optical fiber 35 is described. The optical fiber 35 includes: a core 36; a clad 37 coating the core 36; and a plastic clad 38 coating the clad 37. The clad 37 is configured to have a smaller refractive index than the core 36 and the plastic clad 38 is configured to have a significantly smaller refractive index than the clad 37. In such an optical fiber 35, the core 36 may have a diameter of 10 μm, the clad 37 may have an outer diameter of 125 μm, and the plastic clad 38 may have an outer diameter of 250 μm, for example. Silica doped with germanium dioxide of 1 mol %, for example, may be used as a material for the core 36, silica without any dopant, for example, may be used as a material for the clad 37, and UV curable resin, for example, may be used as a material for the plastic clad 38.

Figure 3:
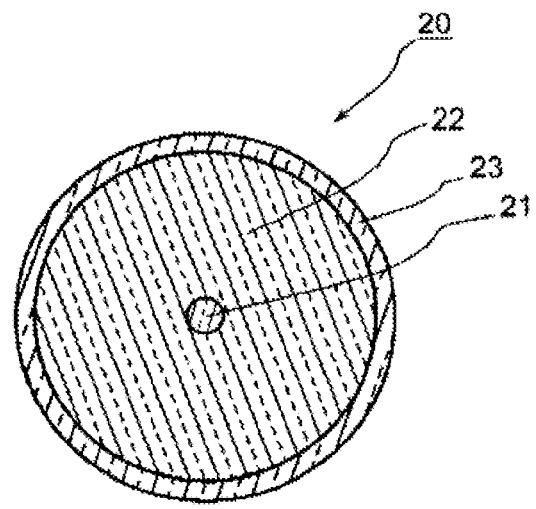
FIG. 3 schematically shows a structure of a cross-section perpendicular to a longitudinal direction of a rare earth-doped fiber shown in FIG. 1.

FIG. 3 schematically shows a structure of a cross-section perpendicular to a longitudinal direction of the rare earth-doped fiber 20 connected to the optical fibers 35 and 45. The rare earth-doped fiber 20 includes: a core 21 doped with rare earth elements; a clad 22 coating the core 21; and a plastic clad 23 coating the clad 22. The clad 22 is configured to have a smaller refractive index than the core 21 and the plastic clad 23 is configured to have a smaller refractive index than the clad 22. In such a rare earth-doped fiber 20, the core 21 may have a diameter of 10 μm, the clad 22 may have an outer diameter of 125 μm, and the plastic clad 23 may have an outer diameter of 150 μm, for example. Silica doped with ytterbium, for example, may be used as a material for the core 21, silica without any dopant, for example, may be used as a material for the clad 22, and UV curable resin, for example, may be used as a material for the plastic clad 23.

Figure 4:
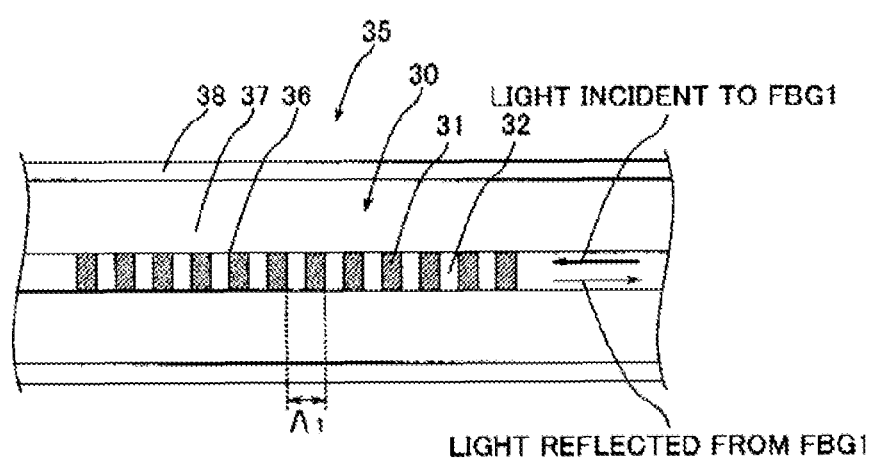
FIG. 4 schematically shows a structure of a cross-section along a longitudinal direction of the optical fiber formed with a first FBG shown in FIG. 1.
Figure 5:
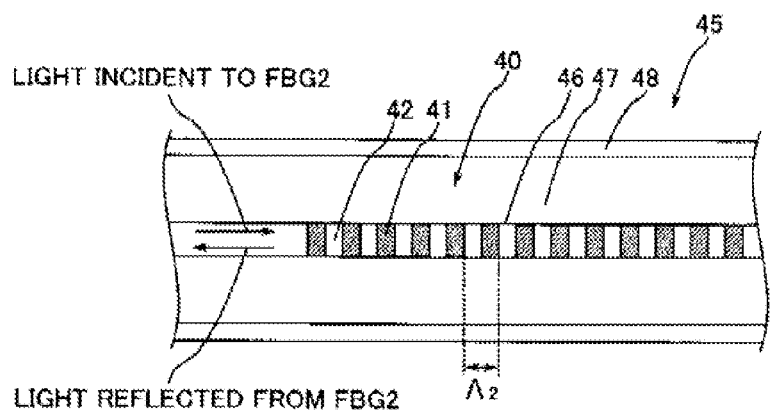
FIG. 5 schematically shows a structure of a cross-section along a longitudinal direction of the optical fiber formed with a second FBG shown in FIG. 1.
Figure 6:
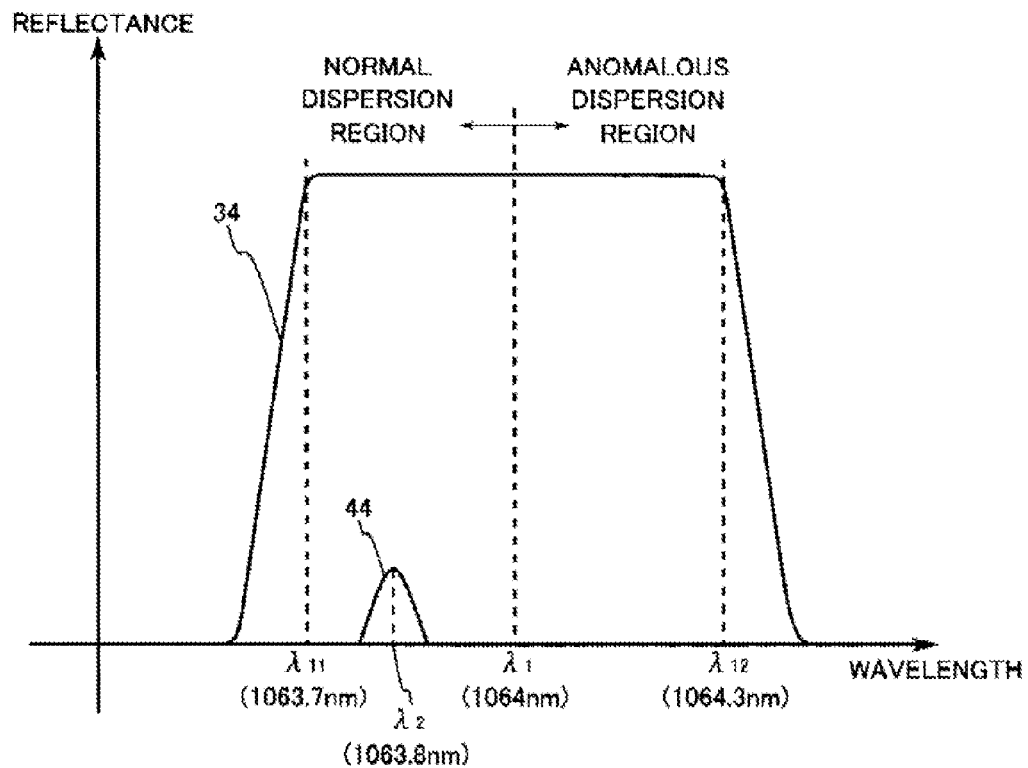
FIG. 6 shows a relationship between a wavelength and a reflectance in the first FBG and the second FBG.

Next, the first FBG 30 and the second FBG 40 will be explained. FIG. 4 schematically shows a structure of a cross-section along a longitudinal direction of the optical fiber 35 formed with the first FBG 30 and FIG. 5 schematically shows a structure of a cross-section along a longitudinal direction of the optical fiber 45 formed with a second FBG 40. FIG. 6 shows a relationship between a wavelength and a reflectance of light reflected by the first FBG 30 and the second FBG 40. In FIG. 6, a side lobe is not shown.

As shown in FIG. 4, the first FBG 30 is formed in the optical fiber 35 connected to the rare earth-doped fiber 20 on the side of the pumping light source portion 10. In the core 36 of the optical fiber 35, the first FBG 30 includes high refractive index portions 31, which have an increased refractive index, and low refractive index portions 32, which have the same refractive index as the core 36 and provided between the high refractive index portions 31, periodically along the longitudinal direction of the optical fiber 35.

The first FBG 30 is configured to have Bragg wavelength of $\lambda_1$ as shown by a curved line 34 in FBG 6, and in a wavelength region from $\lambda_{11}$ to $\lambda_{12}$ in the reflection wavelength band, the first FBG 30 is in saturation and reflects light at a reflectance of 99% or more. Therefore, in this wavelength region from $\lambda_{11}$ to $\lambda_{12}$, the fluctuation range of reflectance is suppressed to be lower than 1%. As described above, the first FBG 30 is configured to have a substantially constant reflectance in the predetermined wavelength region from $\lambda_{11}$ to $\lambda_{12}$ including Bragg wavelength $\lambda_1$ of the reflection wavelength band as shown by the curved line 34 in FIG. 6.

The first FBG 30 as described above is configured to have a period $\Lambda_1$ of the high refractive index portion 31 and the low refractive index portion 32 satisfying the relationship:

$$\Lambda_1 2n_{\mathit{eff}1} \lambda_1$$

where $n_{\mathit{eff}1}$ indicates an effective refractive index of the first FBG 30 in the optical fiber 35.

As the first FBG 30, an FBG that has Bragg wavelength $\lambda_1$ of 1064.0 nm and reflects light having a wavelength from 1063.7 nm to 1064.3 nm at a reflectance of 99% or more as shown by the curved line 34 in FIG. 6, for example, may be used. As such an FBG, one having the high refractive index portions 31 and the low refractive index portions 32 at a period of 336 nm, a refractive index difference between the high refractive index portions 31 and the low refractive index portions 32 of $5.5 \times 10^{-4}$, and a length of 3.0 mm, for example, may be used.

On the other hand, as shown in FIG. 5, the second FBG 40 is formed in the optical fiber 45 connected to the rare earth-doped fiber 20 on the side opposite to the optical fiber 35. In the core 46 of the optical fiber 45, the first FBG 40 includes high refractive index portions 41, which have an increased refractive index, and low refractive index portions 42 periodically along the longitudinal direction of the optical fiber 45.

The second FBG 40 is configured to have Bragg wavelength of $\lambda_2$ that is on the short wavelength side of the Bragg wavelength $\lambda_1$ of the first FBG 30 as shown by a curved line 44 in FIG. 6. As shown in FIG. 6, the second FBG 40 is configured to have the reflection wavelength band in the reflection wavelength band of the first FBG 30, and the second FBG 40 is configured to have a lower reflectance of light than that of the first FBG 30. It is preferable that the Bragg wavelength $\lambda_2$ of the second FBG 40 is the intermediate wavelength between the wavelength $\lambda_{11}$, which is at the shortest wavelength side of the reflection wavelength band from $\lambda_{11}$ to $\lambda_{12}$ where the reflectance of the first FBG 30 is substantially constant, and the Bragg wavelength $\lambda_1$ of the first FBG 30. With such a configuration, the reflectance of the first FBG 30 can be easily maintained in a constant band when the Bragg wavelength $\lambda_2$ of the second FBG 40 is on the short wavelength side of the Bragg wavelength $\lambda_1$ of the first FBG 30 even when the reflection wavelength band of the second FBG 40 changes due to temperature dependency of the refractive index of the optical fiber 45 and the like.

The second FBG 40 as described above is configured to have a period $\Lambda_2$ of the high refractive index portion 41 and the low refractive index portion 42 satisfying the relationship:

$$\Lambda_2 = 2n_{\mathit{eff}2} \lambda_2$$

where $n_{\mathit{eff}2}$ indicates an effective refractive index of the second FBG 40 in the optical fiber 45.

As the second FBG 40, an FBG that has Bragg wavelength $\lambda_2$ of 1063.8 nm, the reflectance at Bragg wavelength of 10%, and the full width at half maximum of the reflectance of 0.2 nm, for example, may be used assuming that the first FBG 30 has the Bragg wavelength $\lambda_1$ and the reflection wavelength band as described above. As such an FBG, one having the high refractive index portions 41 and the low refractive index portions 42 at a period of 336 nm, a refractive index difference between the high refractive index portion 41 and the low refractive index portion 42 of $4 \times 10^{-5}$, and a length of 1.8 mm, for example, may be used.

Next, laser output of the fiber laser device 100 will be explained.

First, pumping light is output from the pumping light source 11. The output pumping light has the wavelength of 916 nm, for example. The pumping light output from the pumping light source 11 is input to the rare, earth-doped fiber 20 through the optical fiber 12 and the first FBG 30 in the optical fiber 35. In the rare earth-doped fiber 20, the pumping light is absorbed by the earth elements doped to the core 21 of the rare earth-doped fiber 20. Accordingly, the earth elements are excited. Then, the excited earth elements emit spontaneous emission light of a predetermined wavelength. The spontaneous emission light of in this case may be light having the center wavelength of 1070 nm and a constant band, for example. The spontaneous emission light propagates through the rare earth-doped fiber 20 and input to the second FBG 40 in the optical fiber 45. The second FBG 40 reflects light in reflection wavelength band of the second FBG 40 out of the spontaneous emission light input to the second FBG 40. At this time, the center wavelength of light reflected by the second FBG 20 is the Bragg wavelength $\lambda_2$ of the second FBG 40. Accordingly, light reflected by the second FBG 40 out of the spontaneous emission light input to the second FBG 40 is again amplified by the stimulated emission of the earth elements in the rare earth-doped fiber 20. The amplified light then reaches the first FBG 30. Since the reflection wavelength band of the first FBG 30 is wider than the reflection wavelength band of the second FBG 40, the first FBG 30 reflects light input thereto. Accordingly, the light reflected by the first FBG 30 is again amplified in the rare earth-doped fiber 20. Then, the amplified light is again input to the second FBG 40 and a part of the light transmits through the second FBG 40. The light transmitting through the second FBG 40 is output from the fiber laser device 100 as laser light.

At this time, when the first FBG 30 is configured to have the Bragg wavelength $\lambda_1$ of 1064.0 nm and reflect light having a wavelength from 1063.7 nm to 1064.3 nm at a reflectance of 99% or more and the second FBG 40 is configured to have the Bragg wavelength $\lambda_2$ of 1063.8 nm, the reflection wavelength band in the reflection wavelength band of the first FBG 30, and the reflectance of 10% as described above, a part of light resonating between the first FBG 30 and the second FBG 40 transmits through the second FBG 40 so that the laser light having the center wavelength of 1063.8 nm is output from the fiber laser device 100.

With the fiber laser device 100 of this embodiment, when the pumping light output from the fiber laser device 11 is input to the rare earth-doped fiber 20, the earth elements in the rare earth-doped fiber 20 are excited. The excited earth elements emit light having a longer wavelength than the pumping light. The light is input from the rare earth-doped fiber 20 to the second FBG 40 and reflected by the second FBG 40. The light that is reflected is again input to the rare earth-doped fiber 20 as the reflected light. Then, in the rare earth-doped fiber 20, intensity of the reflected light is amplified by the stimulated emission of the earth elements caused by the reflected light. Further, the reflected light is input to the first FBG 30 and then reflected. Then, the reflected light is again input to the rare earth-doped fiber 20 and amplified. By repeating the process, light resonates between the first FBG 30 and the second FBG 40 while being amplified. A part of light resonating while being amplified as described above is output as laser light from the side of the second FBG 40 having the lower reflectance.

At this time, the second FBG 40 is configured to have the reflection wavelength band in the reflection wavelength band of the first FBG 30, and the second FBG 40 is configured to have a lower reflectance of light than that of the first FBG 30. Therefore, the center wavelength of the light resonating between the first FBG 30 and the second FBG 40 becomes the same as the Bragg wavelength of the second FBG 40. Since the Bragg wavelength of the second FBG 40 is on the short wavelength side of the Bragg wavelength of the first FBG 30, the wavelength of the light reflected by the first FBG 30 is on the short wavelength side of the Bragg wavelength of the first FBG 30. When the first FBG 30 reflects the light on the short wavelength side of the Bragg wavelength of the first FBG 30, the first FBG 30 has a normal dispersion value with respect to the input light. Therefore, the first FBG 30 is prevented from exerting modulation instability. Accordingly, the intensity of light output as laser light from the second FBG 40 side of the fiber laser device 100 can be stabilized.

Although the invention has been described above by reference to the embodiment as an example, the invention is not limited thereto.

For example, the first FBG 30 is formed in the optical fiber 35 that is fusion-connected to the pumping light source portion 10 side of the rare earth-doped fiber 20, and the second FBG 40 is formed in the optical fiber 45 that is fusion-connected to the rare earth-doped fiber 20 on the opposite side to the first FBG 30, but the invention is not limited thereto. For example, the first FBG 30 and the second FBG 40 may be formed at both ends of the rare earth-doped fiber 20.

Although each of the first FBG 30 and the second FBG 40 is configured to be an FBG having high refractive index portions and low refractive index portions periodically, the high refractive index portions and the low refractive index portions are not necessarily arranged periodically in the area that does not affect reflection.

EXAMPLES

Hereinafter, the invention will be more concretely explained with an example and a comparative example, but the invention is not limited thereto.

First Example

A rare earth-doped fiber of 9 m length including: a core having a diameter of 10 μm; a clad having an outer diameter of 125 μm; and a plastic clad having an outer diameter of 150 μm was prepared. Silica doped with ytterbium and aluminum was used for the core of the rare earth-doped fiber, silica without any dopant was used for the clad, and UV curable resin was used for the plastic clad.

Next, an optical fiber including: a core doped with germanium dioxide of 1 mol % and having a diameter of 10 μm; a clad coating the core and having an outer diameter of 125 μm, and a plastic clad coating the clad and having an outer diameter of 250 μm was prepared and a first FBG was formed in the optical fiber. Upon formation of the first FBG, ultraviolet light having a wavelength of 248 nm and an intensity of 2 mW/mm$^2$ was irradiated for 500 seconds by phase mask method. In this manner, the first FBG was configured to be an FBG that has the high refractive index portions and the low refractive index portions at a period of 366 nm and Bragg wavelength of 1064.0 nm, and that reflects light having a wavelength from 1063.7 to 1064.3 nm at a reflectance of 99%.

Then, an optical fiber similar to the optical fiber in which the first FBG was formed was prepared and a second FBG was formed in the optical fiber. The second FBG was formed similarly to the first FBG except that ultraviolet light was irradiated for 40 seconds. In this manner, the second FBG was configured to be an FBG that has the high refractive index portions and the low refractive index portions at a period of 366 nm and Bragg wavelength of 1063.8 nm, a reflectance of 10% and a half width of the reflectance of 0.2 nm.

Next, the optical fiber formed with the first FBG was fusion-connected to one end of the rare earth-doped fiber, and the optical fiber formed with the second FBG was fusion-connected to the other end of the rare earth-doped fiber.

First Comparative Example

An optical fiber formed with a first FBG and an optical fiber formed with a second FBG were fusion-connected to both ends of a rare earth-doped fiber similarly to the first example excepting that the second FBG is configured to have Bragg wavelength same as that of the first FBG.

Figure 7:
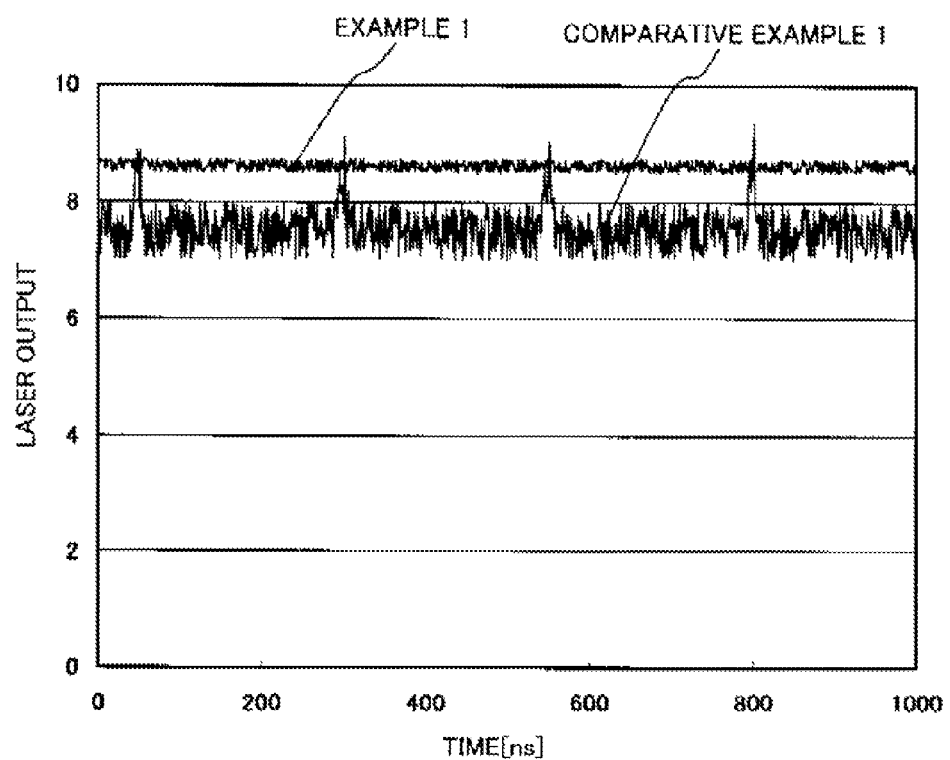
FIG. 7 shows intensities of laser light output from rare earth-doped fibers at time periods.

Then, pumping light having a wavelength of 915 nm is input to the rare earth-doped fiber of the first example and the rare earth-doped fiber of the first comparative example respectively so as to output laser light having a wavelength of 1063.8 nm. Then, the intensity of the laser light output from the rare earth-doped fibers was measured. The result is shown in FIG. 7. FIG. 7 shows change of intensities of laser light output from the rare earth-doped fibers at time periods. In FIG. 7, the vertical axis does not have a unit. As shown in FIG. 7, the laser light output from the rare earth-doped fiber of the first example had stable intensity. On the other hand, the laser light output from the rare earth-doped fiber of the first comparative example had varying and instable intensity.

From the examples, it was confirmed that the fiber laser device according to the invention can stabilize intensity of laser light output therefrom.

INDUSTRIAL APPLICABILITY

According to the invention, a fiber laser device capable of stabilizing intensity of laser light output therefrom can be provided.

The invention claimed is:
1. A fiber laser device comprising:
a pumping light source configured to output pumping light;
a rare earth-doped fiber to which the pumping light is input; and
a first FBG formed on one side of the rare earth-doped fiber and a second FBG formed on the other side of the rare earth-doped fiber that are configured to reflect light amplified in the rare earth-doped fiber, wherein
the second FBG has a reflectance lower than that of the first FBG, a reflection wavelength band in that of the first FBG, and a center wavelength on short wavelength side of a center wavelength of the first FBG, wherein the entire reflection wavelength band of the second FBG is on short wavelength side of the center wavelength of the first FBG and within the reflection wavelength band of the first FBG on the short wavelength side of the center wavelength of the first FBG such that the first FBG exerts a property of a normal dispersion with respect to an input light reflected from the second FBG to prevent a modulation instability.

2. The fiber laser device according to claim 1, wherein the first FBG has the reflectance that is substantially constant in the reflection wavelength band.

3. The fiber laser device according to claim 2, wherein the center wavelength of the second FBG is an intermediate wavelength between the wavelength which is at the shortest wavelength side of the reflection wavelength band and the center wavelength of the first FBG.

4. The fiber laser device according to claim 3, wherein the first FBG includes a substantially constant reflectance between the wavelength at the shortest wavelength side of the reflection wavelength band and the center wavelength.

\* \* \* \* \*